United States Patent [19]

Fung

[11] Patent Number: 5,586,444
[45] Date of Patent: Dec. 24, 1996

[54] CONTROL FOR COMMERCIAL REFRIGERATION SYSTEM

[75] Inventor: Kwok K. Fung, South Bend, Ind.

[73] Assignee: Tyler Refrigeration, Niles, Mich.

[21] Appl. No.: 428,580

[22] Filed: Apr. 25, 1995

[51] Int. Cl.$^6$ ............................... F25B 7/00; F04B 41/06
[52] U.S. Cl. ............... 62/117; 62/175; 318/610; 364/163; 417/5
[58] Field of Search ............... 62/175, 510, 228.3, 62/228.4, 117; 236/78 D; 417/5; 318/610; 364/163

[56] References Cited

U.S. PATENT DOCUMENTS

| | | | |
|---|---|---|---|
| 3,163,813 | 12/1964 | Oldenburger | 318/610 |
| 3,775,653 | 11/1973 | Peterson et al. | 318/610 |
| 4,633,672 | 1/1987 | Persem et al. | 62/175 X |
| 4,951,475 | 8/1990 | Alsenz | 62/175 X |

FOREIGN PATENT DOCUMENTS

0263771  12/1985  Japan ............... 417/5

Primary Examiner—William E. Wayner
Attorney, Agent, or Firm—Baker & Daniels

[57] ABSTRACT

A compressor control system for a commercial refrigeration system includes a variable speed compressor and multiple fixed speed compressors. The control system calculates a variable which fluctuates according to the desired capacity of the system and is calculated as a function of the difference between a variable indicative of the refrigeration load on the system, such as compressor suction pressure, and a target value. A "PID" proportional-integral-differential (PID) controller is used in which terms have been added which fluctuate as a function of the square of the difference between the sensed variable and the target value and as a function of the second derivative of the control variable with respect to time. Fixed speed compressors are turned on or off and the speed of the variable speed compressor is adjusted to bring the actual refrigeration capacity of the system in line with the system refrigeration requirements.

31 Claims, 10 Drawing Sheets

| COMPRESSOR # NO | 1-VS | 2 | 3 | 4 | TOTAL CAPACITY (HP) of fixed speed compressor | COM NO |
|---|---|---|---|---|---|---|
| CAPACITY (HP) | 20 | 15 | 10 | 5 | | |
| ON/OFF | 0 | 0 | 0 | 0 | 0 | 0 |
| TABLE | 1 | 0 | 0 | 0 | 0 | 1 |
| (ON = 1; | 1 | 0 | 0 | 1 | 5 | 2 |
| OFF = 0) | 1 | 0 | 1 | 0 | 10 | 3 |
| | 1 | 0 | 1 | 1 | 15 | 4 |
| | 1 | 1 | 0 | 0 | 15 | 5 |
| | 1 | 1 | 0 | 1 | 20 | 6 |
| | 1 | 1 | 1 | 0 | 25 | 7 |
| | 1 | 1 | 1 | 1 | 30 | 8 |

CONTROL FOR COMMERCIAL REFRIGERATION SYSTEM

This invention relates to a controller for controlling the refrigeration capacity of a commercial refrigeration system.

Modern commercial systems of the type used to display cooled and frozen merchandise in supermarkets usually consist of a number of interconnected refrigeration cases which are operated by refrigeration compressors mounted on a rack in, for example, the back room of the supermarket. As many as eight or more separate compressors for each parallel compressor system may be used to provide refrigeration for the refrigerated display cases in a modern supermarket. Accordingly, a substantial fraction of the energy used in a modern supermarket is consumed by the compressors used to provide cooling for the refrigeration and freezer cases. Accordingly, it is desirable to control the system so that only as much cooling capacity is provided by the system as is required by the refrigerating cases to thereby minimize power consumption. However, controlling the refrigeration capacity of a commercial refrigeration system is difficult, because the refrigeration load may vary widely from moment to moment. For example, the refrigeration load may shift in response to an increase in the number of customers opening and closing the doors of the refrigerator cases, or because one or more of the refrigerated cases begins or ends a defrost cycle, or because the store employees are stocking the cases. For example, when cases are stocked, all of the doors of the cases are opened and product is placed on the shelves within the case, thereby increasing the load dramatically in a very short period of time. Other factors may also influence refrigeration load of the system but not as dramatically as those discussed above; for example, variations in store temperature and humidity also influence the refrigeration load.

Generally, multiple fixed speed compressors are used, and each of the compressors used in the system have different cooling capacities, so that the capacity of the system may be adjusted by switching on and off one or more of the multiple compressors. As disclosed in U.S. Pat. No. Re. 33,620, one of the compressors may be a variable speed compressor, whose capacity may be adjusted by varying the speed of the compressor. The variable speed compressor is used any time that any cooling capacity is required, and one or more of the fixed speed compressors is switched on or off to provide with the variable speed compressor the necessary cooling capacity to the system.

The present invention provides a control for a commercial refrigeration system in which the system is made substantially more responsive to changes in compressor load than systems known in the prior art. Not only can the system of the present invention respond more quickly to an increase or decrease in the refrigeration load of the system, but overshoot and undershoot of the control are minimized, thereby reducing the frequency that compressors must be turned on or off. Furthermore, the present control maintains the variable speed compressor in its optimal speed range of between 50%–100% (for reciprocating compressors; other types of compressors, such as screw compressors, may have a different optimal speed range) over as much of the refrigerator cycle as possible, thereby further improving the overall efficiency of the system and minimizing power consumption. According to the invention, a parameter indicative of the refrigeration load of the system (usually compressor suction pressure, but often the temperature inside the display cases) is sensed and compared to a target value. A control signal is then calculated which is used to vary the speed of the variable speed compressor and is also used to turn on or off one or more of the fixed speed compressors. This control signal is generated using a proportional-integral-differential control law ("PID controller"), to which the second derivative of the error between the sensed variable and the target variable with respect to time and the square of the difference between the sensed variable and the target value are added. The effect of adoting these terms is to substantially reduce the response time of the system to abrupt changes in load, which occur because of any of the factors discussed above. By making the system more responsive, the refrigeration load may be adjusted immediately due to changes, thus assuring that products stored in the refrigeration cases will not be damaged. Also according to the invention, the capacities of the various compressors are placed in array and the system examines several possible combinations of fixed speed compressors which may be used to provide the necessary cooling capacity and selects the combination that most nearly matches the system requirements, again to assure minimum power consumption and to minimize the starting and stopping of compressors, thereby maximizing compressor life. Furthermore, the system includes a control that provides a time delay that assures a minimum time period that a compressor must be off load before it is restarted and return to load and a minimum time delay that a compressor must run before it may be turned off, so that damage to compressors is minimized and compressor life is maximized.

These and other advantages of the present invention will become apparent from the following description, with reference to the accompanying drawings, in which.

Figure 1:
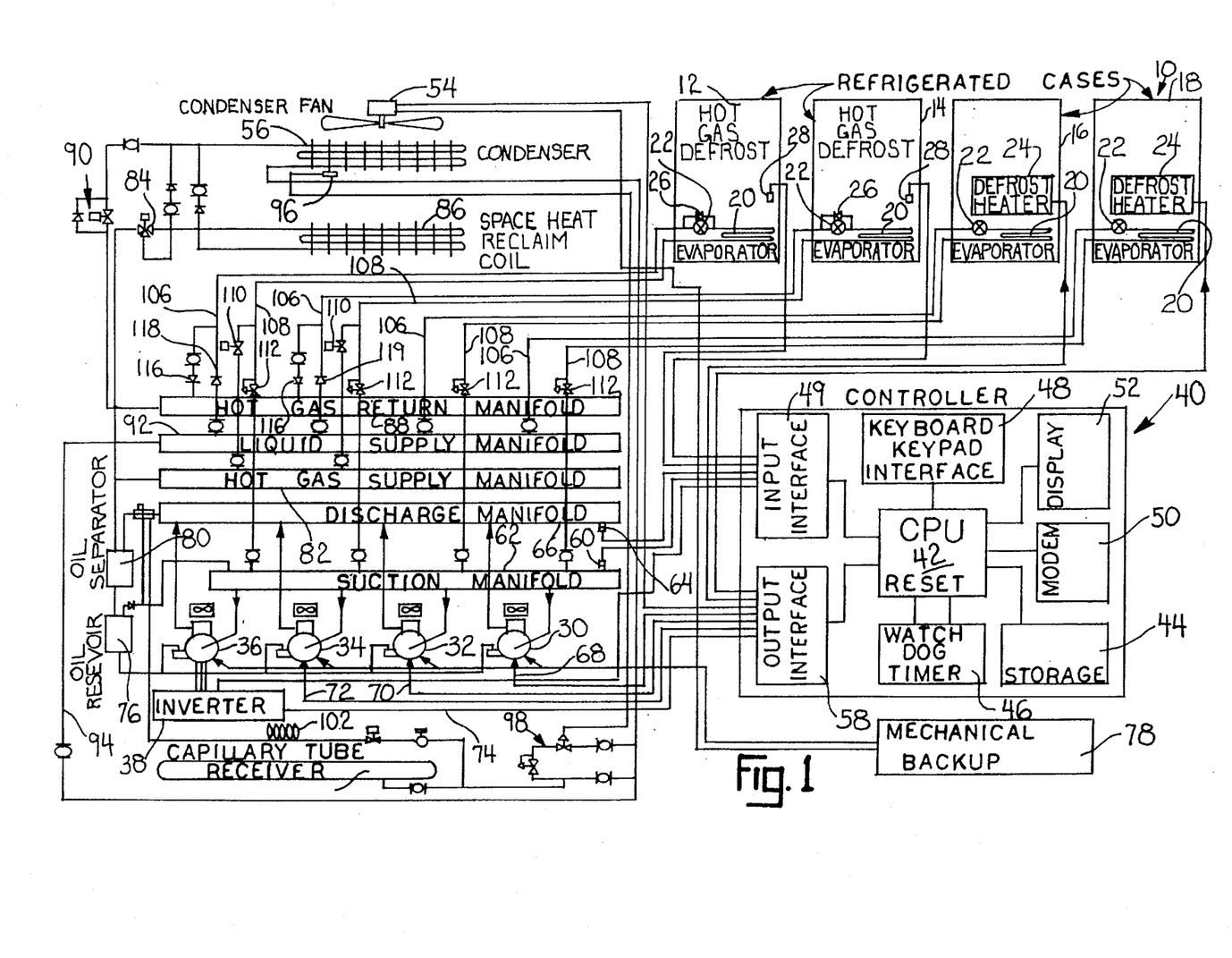
FIG. 1 is a schematic illustration of a commercial refrigeration system made pursuant to the teachings of the present invention.

Referring now to FIG. 1 of the drawings, a commercial refrigeration system generally indicated by the numeral 10 includes refrigerated display cases 12, 14, 16 and 18, which are set up in the customer accessible portion of the store. As used herein, the term "cases" may include a line of several discrete cases that are operated together. Although four refrigerated display cases are illustrated, it is to be understood that any number of refrigerated display cases may be used and the invention is not limited to use with any particular number of display cases. Each of the display cases 12–18 is provided with an evaporator 20 which receives refrigerant expanded by expansion valve 22. As it is well known to those skilled in the art, refrigerated display cases may be defrosted by several common methods; accordingly, display cases 12 and 14 are defrosted by pumping hot gas through their evaporators 20 as will hereinafter be described. Refrigerated display cases 16 and 18 are provided with defrost heaters 24 which are electrically operated and are turned on and off as will hereinafter be described. The refrigerated cases 12 and 14 which are defrosted by the hot gas system include check valves 26 around the expansion valves 22 and a temperature sensor 28 which senses the temperature in the corresponding display case.

Cooling is supplied to the cases 12, 14, 16 and 18 by the liquid expansion method in which a refrigeration gas is compressed by compressors 30, 32, 34 and 36. Compressors 30, 32 and 34 are fixed speed compressors, but each of the fixed speed compressors 30, 32 and 34 have different cooling capacities. Although only three fixed speed compressors are illustrated, it is to be understood that any number of fixed speed compressors may be necessary to supply the required cooling capacity to the system 10. The compressor 36 is a variable speed compressor, the speed of which is controlled by a conventional invertor 38.

Compressors 30, 32, 34 and 36 are controlled by a controller generally indicated by the numeral 40. As will hereinafter be described, the controller 40 receives inputs indicating the refrigeration requirements of the system, and turns on and off the fixed speed compressors 30, 32 and 34 and varies the speed of the variable speed compressor 36, to match the cooling capacity of the system with the cooling requirements as closely as possible. The controller 40 includes a central processing unit or CPU 42 which is programmed as will hereinafter be described. The CPU 42 writes data to and reads data from, a memory data storage unit 44, and is provided with a conventional watchdog timer 46 which monitors for proper operation of the CPU 42. The CPU 42 receives data from the operator through a keyboard/keypad interface 48 and from modem 50, and drives a display 52 which can be monitored by the operator. The CPU receives data from the various sensors of the system as will be hereinafter be described through input interface 48, and controls the compressors 30-36, defrost heaters 24, and the fan 54 of condenser 56, through output interface 58. The input interface receives input signals from the temperature sensors 28, the feedback signal from the invertor 38 which is controlled by the CPU 42 through output interface 58, and signals from pressure sensor 60 in suction manifold 62 and pressure sensor 64 in discharge manifold 66. The output interface 58 is connected to the fixed speed compressors 30, 32 and 34 through lines 68, 70 and 72. Accordingly, signals from output interface 58 are operative to either turn on or turn off the fixed speed compressors 30, 32 and 34. Another line 74 carries a signal from output interface 58 to the invertor 38. This signal adjusts the speed of the variable speed compressor 36 through the invertor in accordance with the signal transmitted over line 74. In case of failure of the controller 40, compressors 30-36 and fan 54 are turned on by mechanical backup device 78.

The compressors 30-36 draw refrigerant in the gaseous state from the suction manifold 62, compress the refrigerant, and discharge the compressed refrigerant from the discharge manifold 66. As the refrigerant is compressed, the temperature of the refrigerant is increased substantially. Compressed refrigerant in discharge manifold 66 is communicated through oil separator 80, which removes oil that may have been passed into the refrigerant from the compressor during compression and transfers the separated oil back into the oil reservoir 76. Compressed refrigerant from discharge manifold 66 is used to charge hot gas supply manifold 82 to supply hot gas for defrosting, as will hereinafter be disclosed. Compressed refrigerant from discharge manifold 66 is also communicated through electrically actuated valve 84 to space heat reclaim coil 86 to provide space heating for the supermarket in which the display cases 12–18 are used. The valve 84 can be operated to bypass space heat reclaim coil and communicate compressed refrigerant directly to the condenser 56. Hot gas returned from the display cases 12, 14 during a defrost cycle, as will hereinafter be explained, is received in a hot gas return manifold 88 and communicated back to the inlet of the condenser 56 through control valve generally indicated by the numeral 90. The condenser 56 removes heat from the hot gas flow out of the discharge manifold 66 and thus changes the phase of the refrigerant to a liquid state. The refrigerant in the liquid state is communicated to a liquid supply manifold 92 through a line 94. A temperature sensor 96 operates valve 98 to divert some of the output of the condenser 56 to a receiver 100 in the event that the refrigerant condensing pressure exceeds the setting of valve 98. Refrigerant in the receiver 100 is communicated back into the suction manifold 62 through capillary tube 102.

Liquid refrigerant in supply manifold 92 is communicated to the expansion valves 22 in each of the refrigerator display cases 12–18 through lines 106. Expansion valves 22 causes a drop in pressure of the refrigerant, thereby effecting cooling of the display cases 12–18 by changing the refrigerant from liquid to gas as it passes through evaporators 20 in a manner well known to those skilled in the art. Refrigerant in the gaseous state is returned to the suction manifold 62 via return lines 108.

The refrigerator cases 16 and 18 are defrosted by electric defrosting heaters 24 which is turned on by the CPU when a defrost cycle is initiated. Refrigerator cases 12 and 14 are defrosted by hot gas defrost system, as will hereinafter be explained. Obviously all refrigerator cases could be defrosted by a hot gas system, or all cases could be defrosted by an electrical defrost heater, as desired. When a defrost cycle of the refrigerated cases 12–14 equipped with the hot gas defrost system is necessary, the CPU 42 opens valves 110 and closes valves 112, thereby shutting off the return lines 108 into the suction manifold 62 and opening the lines 108 to the hot gas supply manifold 82. Accordingly, the refrigerant gas in the hot gas supply manifold, which has been compressed and therefore is at an elevated temperature, communicates through the lines 108, through the evaporator coils 20, through the check valve 26 bypassing the expansion valves 22, and into the lines 106. Refrigerant in lines 106 is communicated through to the hot gas return manifold 88 through check valves 116, the valves 117 preventing communication of hot gas into the liquid supply manifold 92. Accordingly, the evaporators 20 in the display cases 12, 14 are defrosted by passing hot gas through the evaporator coils from the hot gas supply manifold 82. When the defrost cycle is terminated, expansion valves 22 of the cases 12, 14 are communicated to the liquid supply manifold 92 and the lines 108 are again open to the suction manifold 62.

As discussed above, a controller 40 adjusts the capacity of the system by turning on or off the fixed speed compressors 30, 32 and 34 and by adjusting the speed of the variable speed compressor 36. The controller 40 effects adjustment of the capacity of the system by sensing a parameter which varies in accordance with the refrigeration load on the system and by adjusting the capacity of the system to minimize the difference between this parameter and a target value. One parameter that may be used is the temperature inside one or more of the refrigerator cases 12–18, but measurement of the pressure in the suction manifold 62 is preferred. Accordingly, pressure sensor 60 measures the pressure in suction manifold 62 and transmits this information to the controller 40 through input interface 49. A target value is set and may be varied, as will hereinafter be described. Controller 40 then operates to adjust the capacity of the system such that the difference between the pressure measured in suction manifold 62 by sensor 60 and the target value is minimized. The capacity of the system 10 is adjusted by running a computer program in the CPU 42 generally indicated by the numeral 118 in FIG. 2. As discussed above, the program 118 will cause one or more of the fixed speed compressors to be turned on or off, and/or will adjust the speed of the variable speed compressor 36, in response to variations in refrigeration demands on the system.

Figure 2:
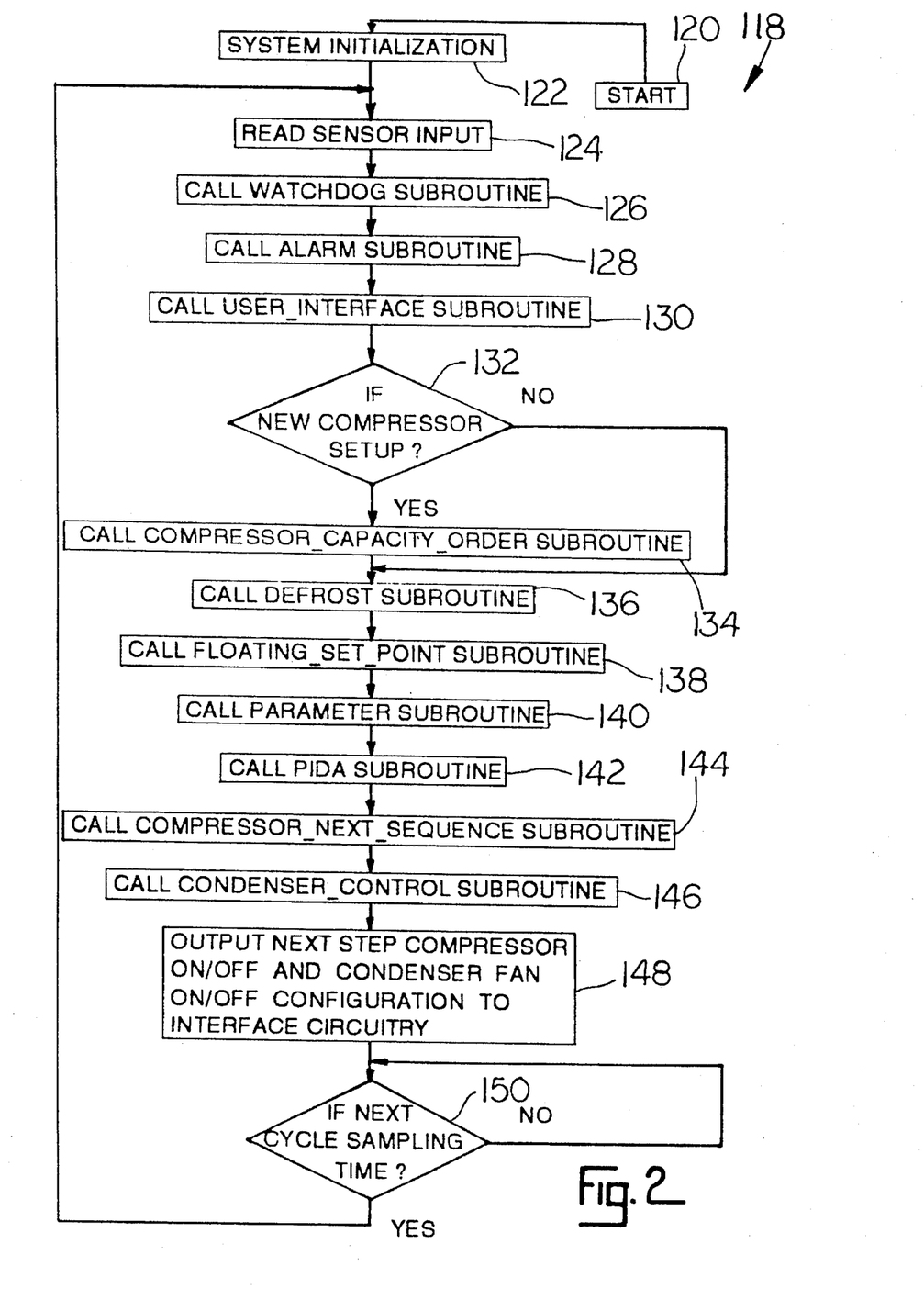
FIG. 2 is a flow chart of the main control program used to control the system illustrated in FIG. 1.

The program 118 is started as indicated at 120, and the system is initialized in the manner well known to those skilled in the art as indicated at 122. The program then instructs, as indicated at 124, that the various sensors, such as sensors 60, 64, and 28, be read. The watchdog subroutine is then called at 126, which reads the watchdog timer 46 to assure that the central processing unit or CPU 42 is operating properly. An alarm subroutine 128 is then called to provide a warning if a system defect is such that the system cannot be operated. The user interface subroutine 130 is then called. Interface subroutine 130 is conventional and permits the operator to input data from the keyboard 48 or receive data from modem 50. Such inputs may include, for example, the number and capacity of the compressors used in the system, and the capacity of the variably speed compressor at its maximum rated speed. The user interface subroutine will accept input on initial start up of the system and whenever any of the system parameters must be changed as, for example, would occur when one or more of the compressor are replaced with a compressor having a different capacity, and/or compressors are added to the system to provide additional capacity.

Figure 3:
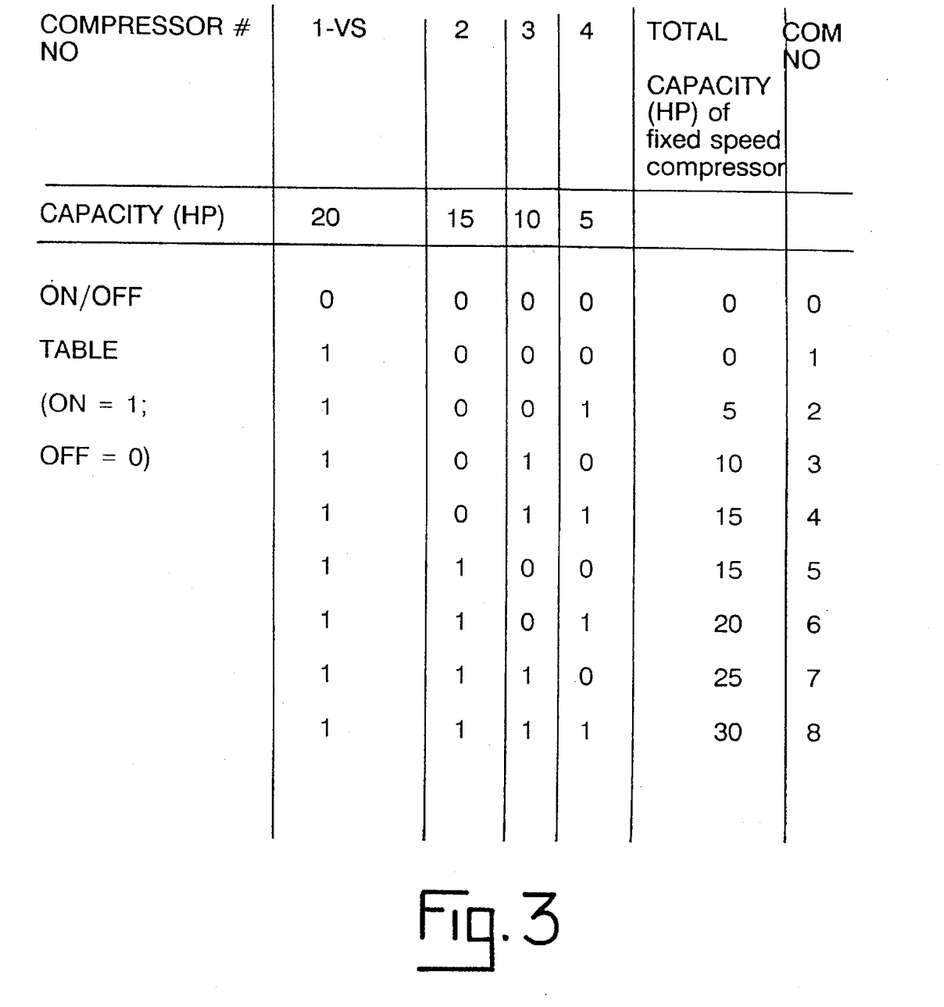
FIG. 3 is an array of the capacities of each compressor and each combination of compressors used in the system illustrated in FIG. 1, the capacities being sorted by the control program illustrated in FIG. 2.

The program 118 then determine at 132 if the configuration of the compressors has been changed. If the compressor set up has been reconfigured, or during the initial start up of the system 10, the compressor capacity subroutine is called as indicated at 134. If a new compressor set up is not present, the program bypasses the compressor capacity order subroutine 134. The compressor capacity order subroutine 134 forms the compressor capacity array as illustrated in FIG. 3. Compressor number 1 is labeled "VS" and refers to variable speed compressor 36. Compressors 2, 3 and 4 are the fixed speed compressors 30, 32 and 34. As indicated in the second line of FIG. 3, the maximum capacity of the variable speed compressor that is, its cooling capacity at its maximum rate of speed, is, for example, 20 hp. The capacity of compressors 2, 3 and 4 are, for example, 15, 10 and 5 hp respectively. The column labeled "COM NO." is an identification number assigned to each of the various combinations of compressors formed in the array. As indicated, a "0" in the array indicates the corresponding compressor has been turned off and a "1" in the array indicates that the corresponding compressor has been turned on. The column labeled "Total Capacity" lists the total capacity of all of the fixed speed compressors that are turned on in each stage. If all of the compressors, including the variable speed compressor, are turned off, the cooling capacity of the system is obviously zero, which is assigned the "COM NO" of zero. The variable speed compressor is the first compressor to be turned on, and the last compressor to be turned off. Accordingly, if only the variable speed compressor is used, the total system capacity is 20 hp, the capacity of the variable speed compressor at its maximum rated speed. The total capacity of each stage listed in the horizontal lines of the array is listed under the column "Total Capacity". As discussed above, the arbitrary COM NOs., which will be referred to hereinafter, are assigned as a shorthand reference to each of the various capacity stages of the combination of compressors 30–36. Although only three fixed speed compressors are listed, it will be understood that multiple compressors are often necessary, and it is not uncommon that eight or more compressors may be used. Since the total number of compressor stage capacity is calculated as equal to $2^{n-1+1}$, where n is the number of compressors, it will be noted that if seven or eight compressors are used there are literally hundreds of different compressor capacity combinations, so the COM NO. may range into the hundreds. The function of the program 118 is to select the proper combination of compressors from the array of FIG. 3, and then to adjust the speed of the variable speed compressor to adjust the system capacity so that the control variable (assumed to be the pressure at the suction manifold 62) is as near the target value as possible. The compressor capacity order subroutine which forms the array illustrated in FIG. 3 is a conventional data processing technique.

The main program 118 then calls the defrost subroutine as indicated at 136. The defrost subroutine 136, as will hereinafter be described, controls the defrost cycles of the refrigerator cases 12–18. The program 118 then calls the floating set point subroutine 138. As discussed above, the present invention senses a variable which reflects the refrigeration demand of the system, preferably the pressure in the suction manifold 62, and controls the compressors 30–36 such that the measured pressure in the suction manifold is as close as possible to the target pressure. The floating set point subroutine calculates the target value as will hereinafter to be described. The program 118 then calls the parameter subroutine 140. The parameter subroutine 140 establishes some of the parameters used in the control law calculations made in the PIDA subroutine 142. PIDA subroutine is a modified "PID" or proportional integral differential controller, to which a second order term has been added, as will hereinafter be described. Program 118 then calls the compressor sequence subroutine 144, which adjusts the speed of the variable compressor 36, and also decides which of the fixed speed compressors 30–34 are to be turned on or off to adjust system capacity.

The main program 118 next calls the condenser control subroutine 146 which turns the condenser fan 54 on and off. As indicated at 148, the main program 118 then outputs the compressor on/off signals and condenser fan on/off signals to the interface circuitry 49, which effects actual control of these components. As indicated at 150, the main program 118 is executed once each cycle if the cycle sampling time has not yet expired, the program waits until it has expired before cycling back to again reading the sensor inputs as indicated at 124.

Figure 4:
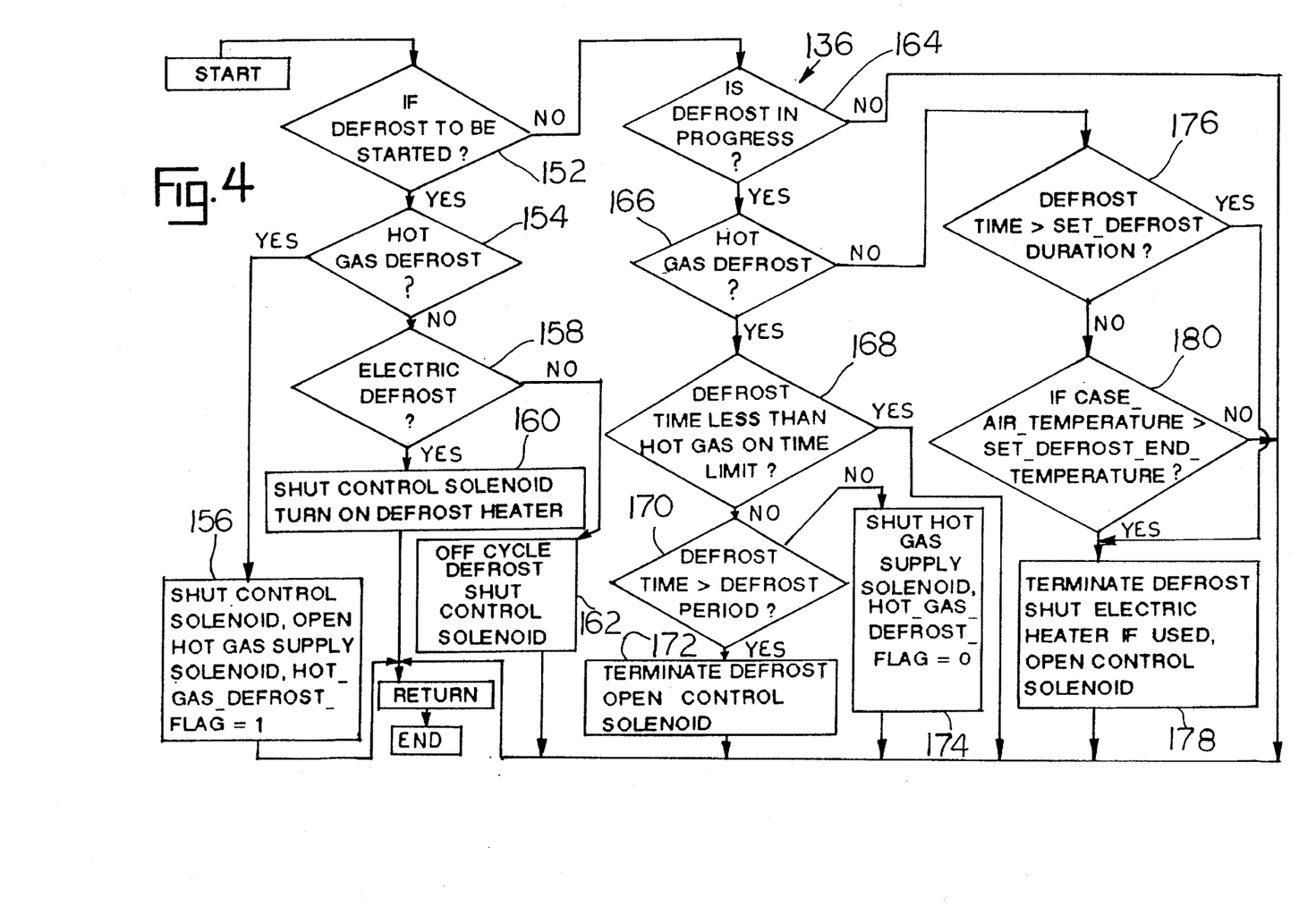
FIGS. 4–9 are flow charts of various subroutines used either in the main control illustrated in FIG. 2 or in one of the other subroutines.

Referring now to the defrost subroutine 136 illustrated in FIG. 4, it should be noted that each of the cases 12–18 are defrosted independently of one another, and it is common that only one or two of the refrigerated cases 12–18 are undergoing a defrost cycle at any one time. Accordingly, the defrost subroutine 136 is executed during each cycle time of the main program 118 for each of the refrigerated cases 12–18 to determine if a defrost cycle should be initiated or terminated in each of the cases. The program 136 first tests, as indicated at 152, if a defrost cycle is to be started for a particular refrigerator cases. Generally, a defrost cycle is initiated at a predetermined time period after the last defrost cycle was initiated. If a defrost cycle is to be started the program then tests, as indicated at 154, if hot gas defrost is being used to defrost the particular refrigerator case. If it is, the program, as indicated at 156, shuts the control solenoid 112 for the display case undergoing a defrost cycle, and opens the corresponding hot gas supply solenoid 110, which connects the evaporator 20 of the refrigerator case undergoing a defrost cycle to the hot gas supply manifold 82. The hot gas defrost flag then set at 1 before program return. If hot gas defrost is not being used, the program then tests at 158, as to whether or not electric defrost is being used. If electric defrost is being used, as indicated at 160, the corresponding control solenoid 112 is turned off, and the defrost heater 24 is turned on. If the test at 158 is negative, neither hot gas defrost nor electric defrost is being used for the particular refrigerator case being controlled. Accordingly, the refrigerator case is defrosted by turning off cooling and allowing defrost by inherent increase in temperature. Accordingly, as indicated at 162, the control valve for that case is shut off before the program returns.

If the test at 152 is negative, indicating that a defrost cycle is not to be initiated, the program then tests at 164 to determine if a defrost cycle is already in progress. If it is not, the program returns. If a defrost cycle is in progress, the program then establishes if hot gas defrost is being used, as indicated at 166, and then determines if the time since initiation of the defrost cycle is less than a predetermined hot gas on time limit, as indicated at 168. Generally, the hot gas defrost cycle initiates a cycle by turning off the valve 112 and turning on valve 110, to initiate flow of discharge gas to the evaporator 20. The hot gas is turned off a time period before the defrost cycle ends. The defrost cycle is terminated by turning the valve 112 back on. Accordingly, if the defrost time is equal to or greater than the hot gas on time limit as tested at 168, the program then tests, as indicated at 170, as to whether the total defrost time is equal to or exceeds the defrost time limit. If the test at 170 is positive, the defrost cycle is terminated, as indicated at 172, by opening the control solenoid 112 and closing the hot gas solenoid 110. If the test at 170 is negative, only the hot gas solenoid 110 is closed, as indicated at 174. If hot gas defrost is not being used, as tested negative at 166, the program next tests, as indicated at 176, as to whether the defrost time is greater than the set defrost time duration. If this test is positive, the program, as indicated at 178, shuts off the heater (if used), and opens control solenoid 112. If the test at 176 is negative, the program then checks, as indicated at 180, as to whether the termination control temperature inside the case is greater than a predetermined limit. If it is, the program proceeds to 178 to terminate the defrost cycle before returning.

Figure 5:
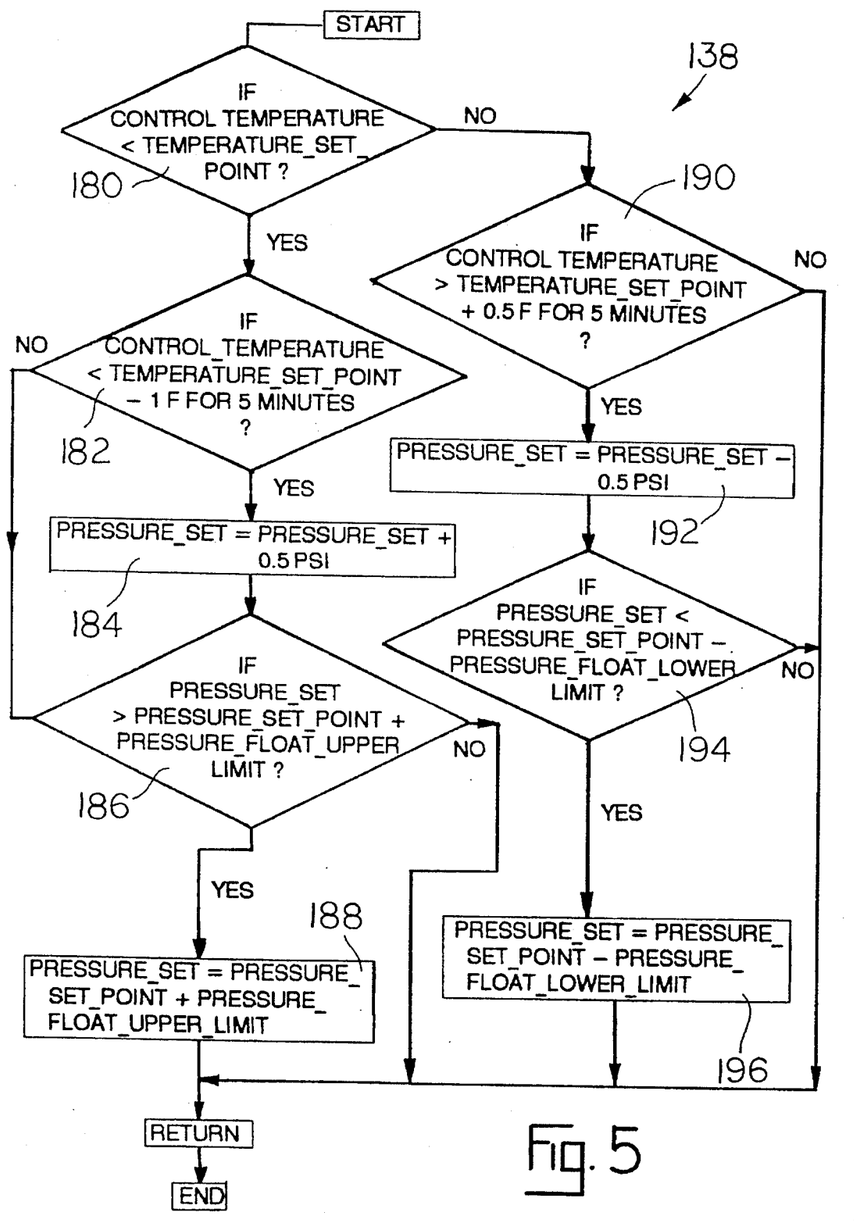

As discussed above, the controller 40 controls the refrigeration capacity of the system by turning on and off the fixed speed compressors 30, 32 and 34 and by adjusting the speed of the variable speed compressor 36, to bring the pressure in the suction manifold 62 as sensed by pressure sensor 60 as close as possible to a predetermined target value. This target value of the pressure level in suction manifold 62 is itself adjusted as a function of the temperature inside of the refrigerated display cases as sensed by temperature sensors 28. The target pressure is allowed to "float" within limits based on the temperature sensed within the refrigerated cases. The floating pressure set point subroutine 138 is illustrated in FIG. 5 first examines at 180 if the control temperature as sensed by sensor 28 is less than the temperature set point. If it is, program 138 then examines, at 182, to determine if the control temperature has been more than 1° F. less than the set point for five minutes. If it has not, the pressure set point is not changed and the program returns. If the test at 182 is positive, the pressure set point is increased by 0.5 psi, as indicated at 184 in FIG. 5. The program then tests, at 186, the pressure set at 184 is greater than a predetermined fixed pressure set point and the upper limit of the pressure set float. If the new pressure set is less than the upper limit, the pressure set is made equal to the upper limit as indicated at 188, before returning.

If the control temperature sensed by temperature sensor 28 is equal to or greater than the temperature set point as tested at 180, the program then examines at 190 if the control temperature has been greater than 0.5° F. above the temperature set point for at least five minutes. If it has not, no change to the pressure set point is made, and the program returns. If the test at 190 is positive, the pressure set point is reduced by 0.5 psi, as indicated at 192. The program then tests if the new pressure set point is greater than a lower limit, as indicated at 194. If the new pressure set is below this lower limit, the new pressure set point is set equal to the lower limit as indicated at 196 before the program returns.

Figure 6:
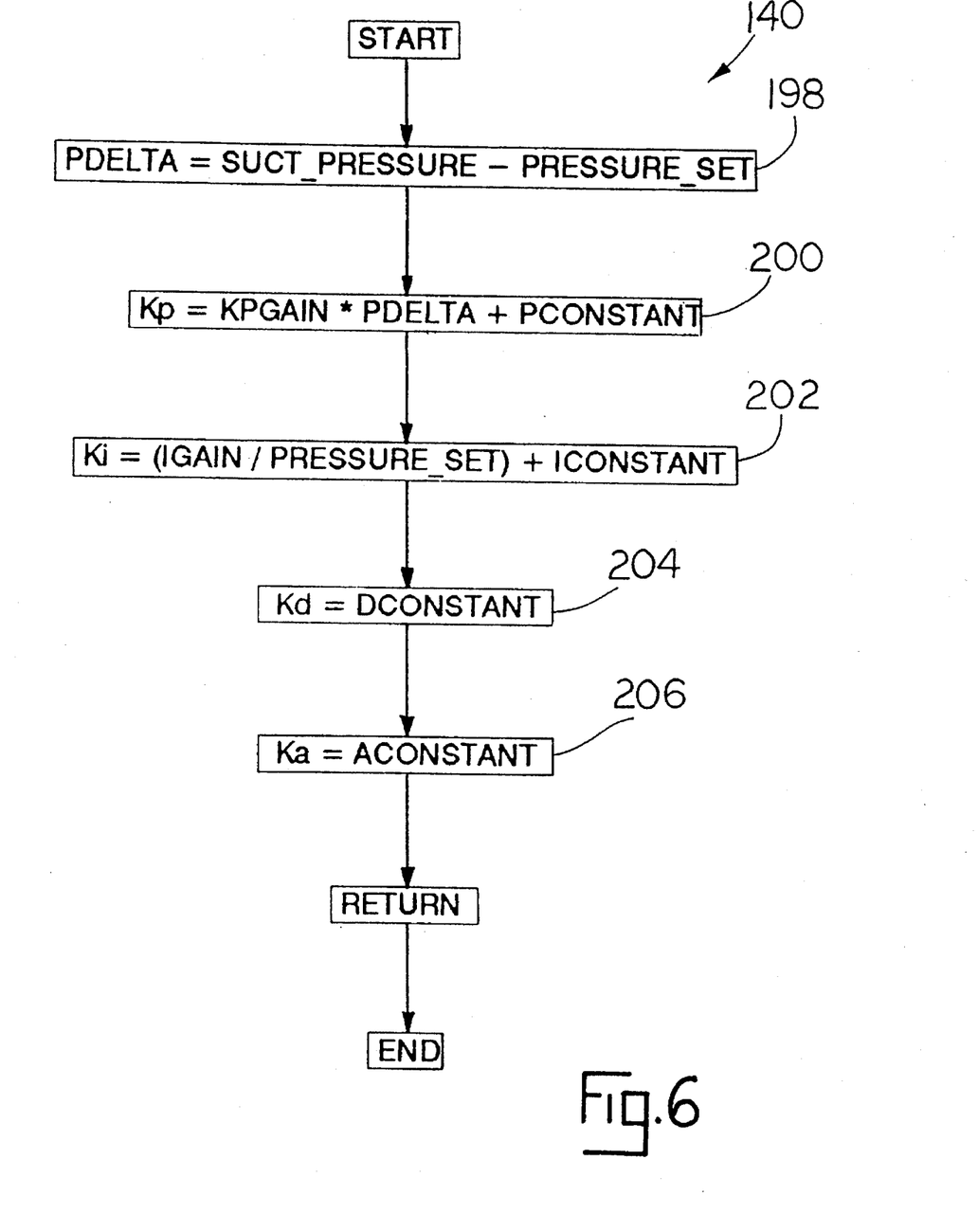

After the pressure set point is established by subroutine 138, the main program 118 calls the parameter subroutine 140 illustrated in FIG. 6, which sets the parameters used in the control calculations set in the PIDA subroutine 142. As indicated at 198, the variable PDELTA is set equal to the pressure in suction manifold 62 as sensed by pressure sensor 60, minus the target pressure calculated by the subroutine 138 (FIG. 5). The program then proceeds at 200 to calculate the coefficient of the proportional term used in the PIDA controller as will hereinafter be disclosed with regard to FIG. 6. This factor Kp is set at equal to a predetermined constant KP multiplied by the term PDELTA as calculated at 198, plus PCONSTANT. The multiplier Ki for the integral term of the PIDA subroutine calculated by subroutine 142, as indicated at 202 in FIG. 6, is set equal to a constant IGAIN divided by the target value of the pressure in suction manifold 62 calculated by subroutine 138 in FIG. 5, plus a constant ICONSTANT. The remaining multipliers used in subroutine 142 are set equal to constants, as indicated at 204 and 206.

Figure 7:
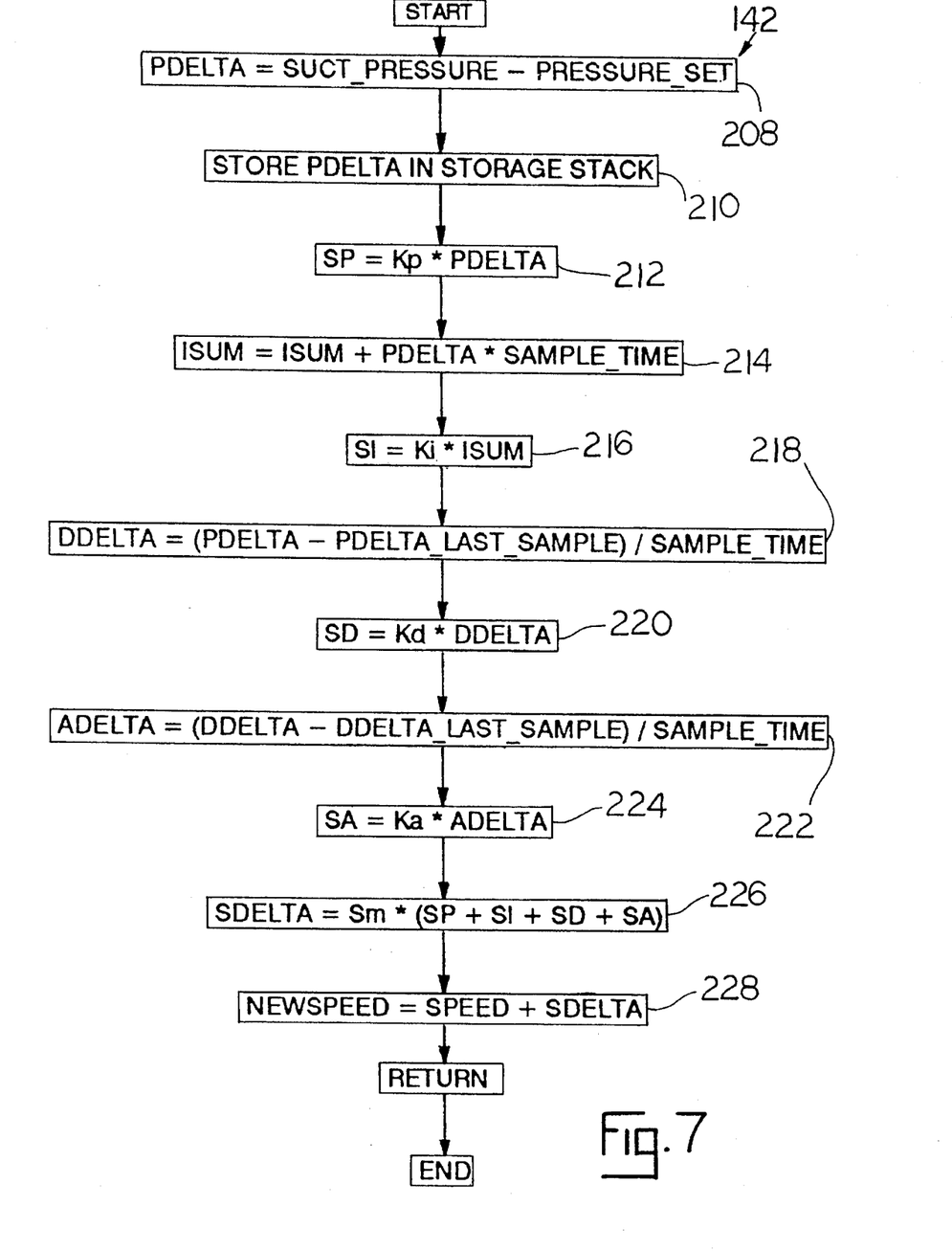

Referring now to FIG. 7, the PIDA subroutine 142 is used to calculate a control signal NEWSPEED which is used by the compressor next sequence subroutine 144 to adjust the speed of the variable compressor 36 and to turn on or off one or more of the fixed speed compressors 30, 32, 34 to bring the pressure of suction manifold 62 as close as possible to the target pressure calculated by subroutine 138 (FIG. 5). Referring to FIG. 7, the variable PDELTA is calculated as equal to the measured suction pressure in suction manifold 62 as measured by pressure sensor 60 minus the pressure set target pressure calculated in FIG. 5, as indicated at 208. An array of PDELTA values is formed as indicated at 210, by storing the values of PDELTA as calculated at 208 in a storage stack each pass through the program. When the stack is full, the oldest PDELTA value is discarded and replaced by the new value.

As indicated at 212, the proportional term SP is calculated as being equal to the multiplier Kp as calculated at 200 in the parameter subroutine 140, times PDELTA. Accordingly, SP is a function of the variable PDELTA and the square of the variable PDELTA, as PDELTA was also used in the calculation of Kp. Referring to 214 in FIG. 7, the variable ISUM is calculated as equal to the previous value of ISUM plus PDELTA as calculated at 208, times the execution time of the main program 118. Accordingly, a new value of ISUM is calculated and stored with each execution of the program. As indicated at 216, the integral term of the PIDA controller is set equal to the multiplier Ki, as calculated at 202 in subroutine 140 (FIG. 6), times ISUM as calculated at 214. Accordingly, the integral term SI is an integral of the previous values of PDELTA, and is also a function of the pressure set point as calculated in FIG. 5.

As indicated at 218, the variable DDELTA is calculated equal to the difference between the PDELTA term calculated in the current pass through the program minus the PDELTA calculated in the last pass through the program, divided by the sample time, thus calculating the rate of change of the error signal between the suction pressure and the target pressure. Accordingly, the differential term SD of the proportional-integral-differential controller is set at 220 in FIG. 7 as equal to a constant times the variable DDELTA calculated at step 218. The program then proceeds to calculate the acceleration term used in the "PIDA" controller of the present invention. As indicated at 222, the variable ADELTA is calculated as the difference between the DDELTA value calculated in the current pass of the program and the DDELTA value calculated in the last pass of the program, divided by the sample time. The second order differential term ADELTA is multiplied by the constant Ka, as indicated at 224, and which forms the variable SA, the acceleration term in the PIDA control algorithm. Accordingly, as indicated in 226, the variable SDELTA is set equal to the constant Sm times the sum of the proportional, integral, derivative and acceleration terms SP, SI, SD, and SA. As indicated at 228, the variable NEWSPEED is set equal to the variable SPEED plus the variable SDELTA calculated in step 226. As will be described hereinafter with regard to FIG. 8, the compressor next sequence subroutine 144, which adjusts the speed of the variable speed compressor and turns on and off the fixed speed compressors as a function of the control variable NEWSPEED, sets the variable SPEED equal to the variable NEWSPEED for the next pass through the main program 118. Although not illustrated in FIG. 7, it is within the skill of the limit the magnitudes of the terms of the PIDA control if necessary.

Figure 8A:
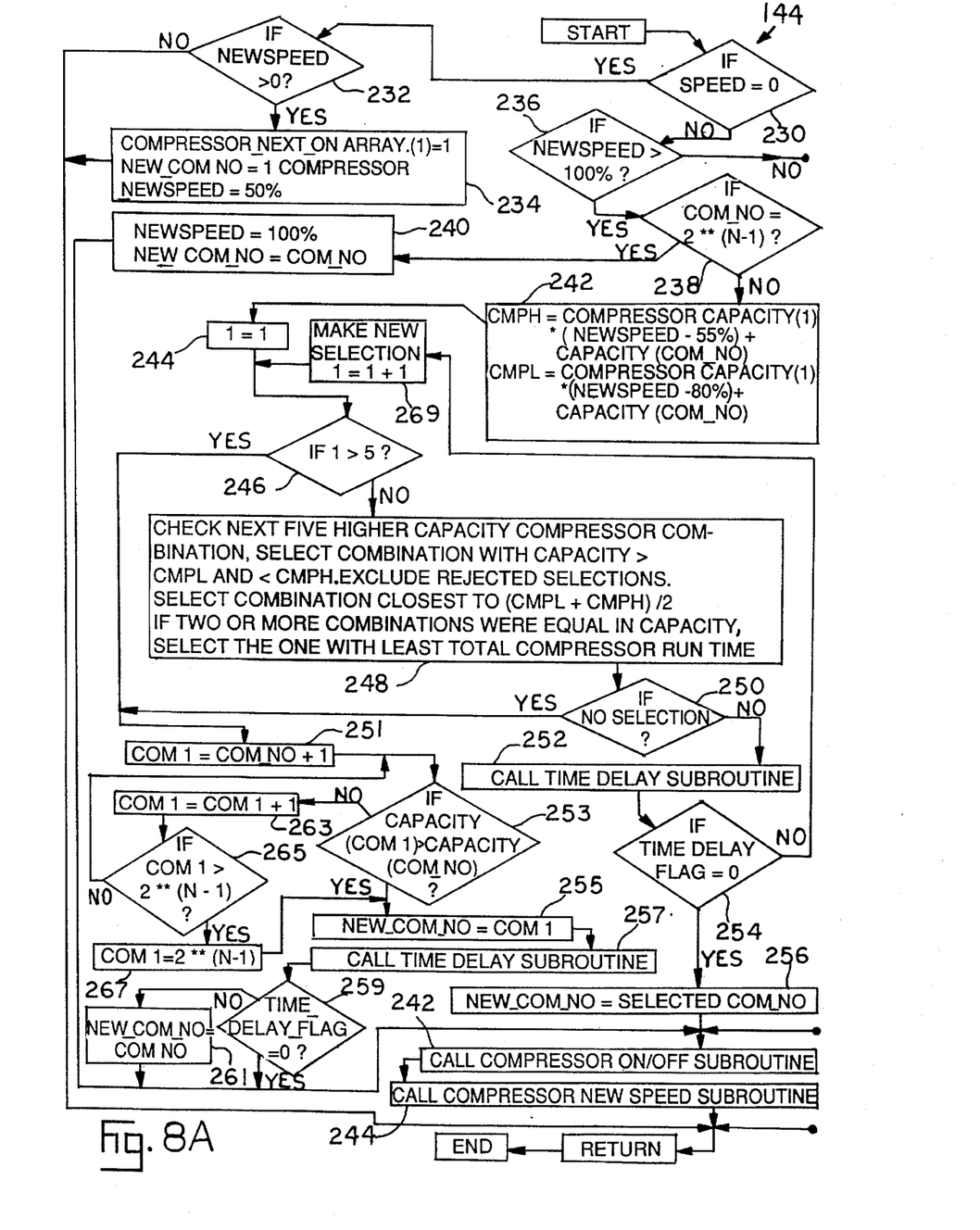
Figure 8B:
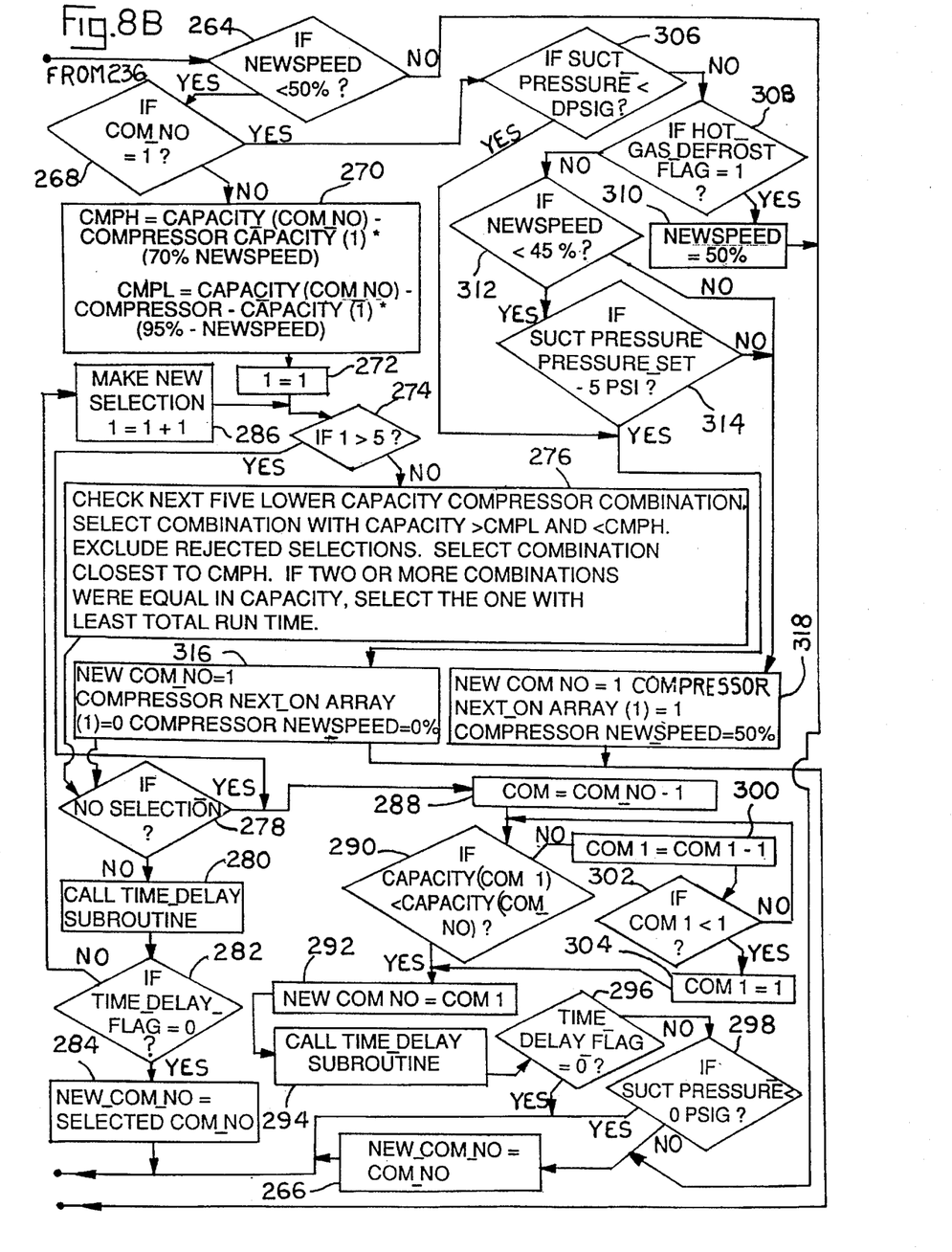

The compressor next sequence subroutine 144 illustrated in FIG. 8 adjusts the speed of the variable speed compressor 36, and turns on or off the fixed speed compressors 30, 32 or 34, as a function of the variable NEWSPEED calculated in the PIDA subroutine 142 and the variable speed, which is the value of the "NEWSPEED" calculated during the previous pass through the program. Referring to FIG. 8, the subroutine 144 first tests at 230 to determine if the variable SPEED calculated during the last pass through the program is equal to zero. If the SPEED is equal to zero, no refrigeration was required in the previous pass through the program, and all of the compressors, including the variable speed compressor, have been turned off. If the variable SPEED in the last pass through the program was equal to zero, the program then tests at 232 as to whether the variable NEWSPEED, is greater than zero. If the calculated variable of NEWSPEED remains at zero, no refrigeration is required. Accordingly, the subroutine returns to the main program. If NEWSPEED as tested at 232 is greater than zero, refrigeration is now required. Accordingly, the program sets the next compressor on array equal to compressor 1, the variable speed compressor, which will accordingly be turned on. Turning to table 3, the COM NO of the stage in which the variable speed compressor is turned on and all the fixed compressors are off is COM NO 1. Accordingly, the NEW COM NO is set equal to 1. Since it is desirable that the speed of the variable speed compressor be at least 50% of its design speed, the speed of the variable speed compressor is set equal to 50% of design speed, as indicated at 234 of FIG. 8. The program then returns to the main program.

If SPEED is not equal to zero, the program then tests at 236 to determine if NEWSPEED calculated by the PIDA subroutine (FIG. 7) exceeds 100%. Since the speed of the variable speed compressor is calculated in the PIDA subroutine without regard to changes in the fixed speed compressor stages, the NEWSPEED can exceed 100%. If the variable NEWSPEED does exceed 100%, additional capacity from the fixed speed compressors is required. Accordingly, if NEWSPEED exceeds 100%, a test is made at 238 to determine if the COM NO calculated from the last pass through the program is equal to the maximum COM NO. If the test at 238 is positive, more refrigeration capacity is required, but all of the available compressors are now being used. Accordingly, the speed of the variable speed compressor is set at 100% of its design speed and the NEW COM NO is set equal to the COM NO, as indicated at 240. The program then branches down to call the compressor on/off subroutine at 242, as will hereinafter be described.

If the test at 238 is negative, indicating that more fixed speed compressor capacity is available, two variables are calculated by which selections of the new fixed speed compressor stage will be made from the array illustrated in FIG. 3. As indicated at 242, the variable CMPH is calculated as equal to the compressor capacity of the variable speed compressor, times the difference between NEWSPEED minus 55% (NEWSPEED is expressed as a percentage of the rated speed of the variable speed compressor), pitts the capacity of the current COM NO, that is, the total of the current fixed speed compressor capacity. Accordingly, the variable CMPH represents a fixed speed compressor capacity that is required if the variable speed compressor is set at 55%. Similarly, the variable CMPL is calculated to determine a fixed speed compressor capacity requirement if the capacity of the variable speed compressor is set at 80% of its rated capacity. Accordingly, if a fixed speed compressor capacity is selected between the variable CMPH and CMPL, the speed of the variable speed compressor would be set at somewhere between 55% and 80% of its rated speed, within the optimal speed range for the variable speed compressor.

As indicated at 244, the variable I is set equal to 1. I is a counter as will hereinafter be explained. A test is made at 246 to determine if I is greater than 5. If the test at 246 is negative, as indicated in 248, the next five higher capacity compressor combinations are selected from the array in FIG. 3. These combinations are the five compressor combinations higher than that represented by the current fixed speed compressor capacity being used.

Figure 9:
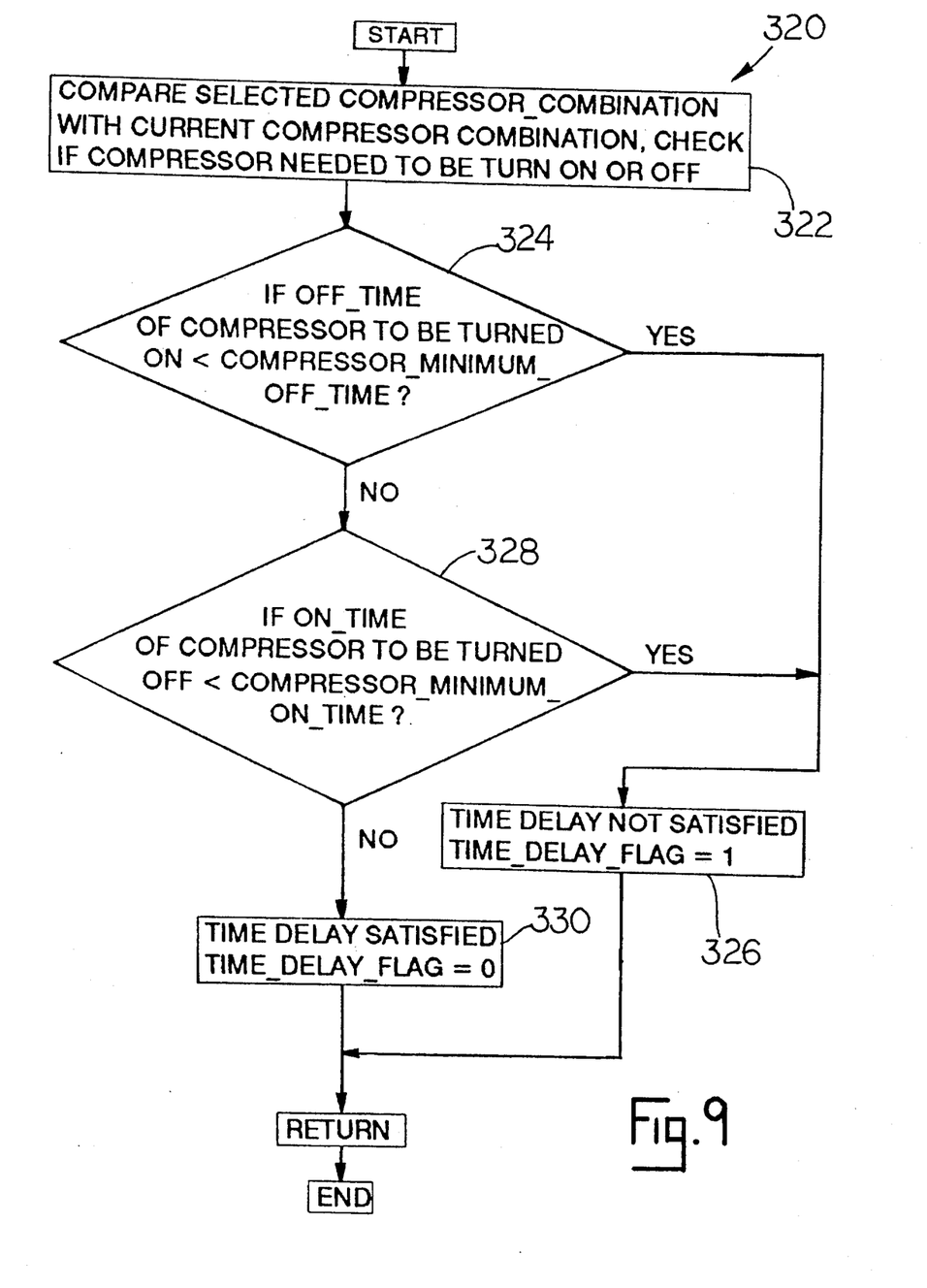

As will hereinafter be explained, some of the possible selections must be excluded because the compressors do not meet the run time requirements. The combination of compressors (identified by the COM NO) are selected from the array with a capacity closest to the average between the variable CMPL and CMPH. If two or more combinations are equal in capacity, the one with the less total compressor run time is selected. A test is then made at 250 to determine if a selection has been made. If a selection has been made as in 248, the time delay subroutine, which will be described hereinafter with regard to FIG. 9, is called, as indicated at 252. After execution of the time delay subroutine, a test is made to determine if the time delay flag set during the execution of the time delay subroutine has been set equal to zero, as indicated in 254. If the time delay flag is equal to zero, indicating that the on/off time delays of the compressors at the selected COM NO have been met, the variable NEW COM NO is set equal to the COM NO of the new combination selected at 248 as indicated at 256. The program then proceeds to call the compressor on/off subroutine, as indicated at 242.

If the time delay flag is 1, a new selection from the array must be made. Accordingly, as indicated at 269, the counter I is increased by 1. A test is made at 246 to determine if I is greater than 5. If I is less than 5, a new selection is made from the array as indicated at 248, with the compressor combination that did not meet with the time delay requirements excluded from consideration. After five passes through the program as measured at 246, or if no selection is made at 250, indicating that none of the next five higher capacity compressor combinations meets the requirements, the program branches to 251, in which the variable COM1 is set equal to the COM NO plus 1, so that compressor stage is selected from the array that is the next one higher than the one being currently used. The program then tests at 253 to determine if the capacity of COM1 is greater than the capacity of the current COM NO. Since it has already been determined that capacity must be added, it is not acceptable to choose a new capacity less than or equal to the current capacity. If the capacity at the test of 253 is positive, the NEW COM NO is set equal to COM1 at 255, the time delay subroutine is called at 257, and the time delay flag is examined at 259. If the time delay requirements have been met, the program proceeds to call the compressor on/off subroutine at 242. If the time delay requirements have not been met, as the program sets the NEW COM NO equal to the number of the old COM NO as indicated at 262, such that no change fixed stage compressor capacity is made.

If the test at 253 is negative, indicating the capacity of COM1 is less than or equal to the capacity of the current COM NO, COM1 is increased by 1 as indicated at 263. a test is made at 265 to determine if the maximum number of fixed stage compressors are already being used, and if this test is negative, the test branches back at 253 to again test that the capacity of COM1 is greater than the capacity of the current COM NO. If the test at 265 indicates that the maximum number of fixed stage compressor has already been used, COM1 is set equal to this maximum at 267 and the program proceeds to set the NEW COM NO equal to COM1 at 255.

Referring back to the test made at 236, if the NEWSPEED is less than 100%, a test is made to determine if NEWSPEED is less than 50% as indicated at 264. If NEWSPEED is greater than 50% as tested at 264, and since NEWSPEED has already been established as being less than 100%, no change in fixed speed compressor capacity is necessary since the speed of the variable speed compressor is currently operating in its optimum designed range of between 50% and 100%. Accordingly, the program sets the NEW COM NO equal to the existing COM NO at 266 and proceeds to call the compressor on/off subroutine at 242.

If the test at 264 indicates that NEWSPEED is less than 50%, it may be desirable to reduce fixed speed compressor capacity by turning off one or more of the fixed speed compressors. Accordingly, the program tests at 268 to determine whether the current COM NO is 1, which indicates that no fixed speed compressors are operating and only the variable speed compressor is operating. If the test at 268 is negative, indicating that at least one fixed speed compressor is operating in addition to the variable speed compressor, the variable CMPH and CMPL are calculated at 270, which, similar to the calculation with regard to 242, establishes the fixed speed compressor capacity that is required if the variable speed compressor is operating between 70% and 95% of its designed speed. The program thereafter sets the counter I at 272, tests the counter at 274, selects a compressor combination from the 5 lower combinations at 276, similar to the manner in which selections are made at 248 of the next higher combinations of compressor when compressor capacity is added. A test is made at 278 to determine if a selection has occurred, the time delay subroutine is called at 280, and the time delay flag is examined at 282, so that the NEW COM NO is set equal to the selected COM NO at 284 if the time delay requirements of the selected compressor capacity have been met. If the time delay requirements have not been met, a new selection must be made, and I is increased by 1 as indicated at 286, before proceeding back through the selection step at 276 to select another combination. If no selections are made after five attempts, or if none of the next five lower capacities can meet the requirements, an arbitrary stage is selected which is the next lower stage below the current stage. Accordingly, the variable COM1 is set equal to the current COM NO minus 1 at 288, a test is made at 290 to assure that the capacity of COM1 is less than the capacity of the current COM NO and if the test is positive a NEW COM NO is set equal to COM1 at 292. The time delay subroutine is called at 294, the time delay flag set in the subroutine is examined at 296, and if the time delay requirements are met, the program then proceed to call the compressor on/off subroutine.

If the time delay requirements are not met, the suction pressure as measured by sensor 60 is tested at 298 to determine if the suction pressure is less than 0 psig. Obviously if suction pressure is already less than 0 psig, it is undesirable to maintain the same compressor stages, which might reduce the suction pressure still further. [If the suction pressure is greater than 0 psig as tested at 298, the NEW COM NO is set equal to COM NO as indicated at 266 before the compressor on/off subroutine 242 is called.] Referring back to the test at 290, if the capacity of COM1 is not smaller than the capacity of COM NO, COM1 is set equal to COM1 minus 1 as indicated at 300 and COM1 is tested at 302 to determine if COM1 is less than 1. If COM1 is not less than 1, the program branches back to the test at 290 to determine if the capacity of COM1 is less than the capacity of COM NO. If the test at 302 is positive, COM1 is set equal to 1 at 304, then the program continues to set the NEW COM NO equal to 1 as indicated at 292.

Referring now back to the test made at 264, if NEWSPEED is less than 50% of the designed speed of the variable speed compressor and the COM NO is equal 1, indicating that only the variable speed compressor is being used and none of the fixed stage compressors are being used, the program then tests at 306 as to whether the suction pressure is less than 0 PSIG. If the suction pressure is less than 0, the program continues on to 316. If the suction pressure is greater than 0 as tested at 306, the hot gas defrost flag is tested at 308 to determine if one of the refrigerator cases is undergoing a hot gas defrost cycle. If it is, the variable NEWSPEED is set equal to 50% as indicated at 310, and the program branches to 266 wherein the NEW COM NO is set equal to the COM NO before calling the compressor on/off subroutine. If no refrigerator case is undergoing a hot gas defrost cycle, NEWSPEED is tested at 312 to determine if NEWSPEED is less than 45%, and the suction pressure is tested at 314 to determine if the suction pressure as sensed by sensor 60 is less than the quantity of 5 psi below the pressure set point. If both NEWSPEED is less than 45% of designed speed and the suction pressure is less than the quantity of 5 psi less than the set point, as indicated at 316, the NEW COM NO is set equal to 0, which is the stage at which no compressor is used, the compressor next on the array, that is, the stage which will next be set is set equal to 0, and the NEWSPEED is set equal to 0, so that all of the compressors are turned off. On the other hand, if the NEWSPEED is between 45% and 50% or the suction pressure is less than 5 psi below the set point, the program continues to 318, where the NEW GCOM NO is set equal to 1, the compressor next on array 1 is set equal to 1 and the compressor NEWSPEED is equal to 50%. In other words, block 318 sets the speed of the variable speed compressor, the only one being used at the time, equal to 50% of rated speed.

After the fixed stage compressors capacity is selected, the compressor next sequence subroutine 144 calls the compressor on/off subroutine as indicated at 242. The compressor on/off subroutine 242 will not be described in detail, since it merely sets up the on or off status of the compressors of the array selected from the arrays listed on the horizontal lines in FIG. 3. After the fixed speed compressor status called for in the stage selected by subroutine 144 are set up by the subroutine 242, the speed of the variable speed compressor is calculated by calling the compressor new speed subroutine as indicated at 244 in FIG. 8. The new speed subroutine sets the speed of the variable speed compressor speed in which the capacity of the variable speed compressor makes up the difference between the capacity of the fixed speed compressors which are operating and the required capacity, however, the compressor new speed subroutine limits the speed of the compressor so that it is between 50% and 100%, even though this may cause the capacity of the system to deviate slightly from the optimum capacity. This is because the efficiency of the variable speed compressor is greater than if run between 50% of its designed speed and 100% of its designed speed. Although it is possible to run the variable speed compressor in excess of 100% of its designed speed, it is not advisable to do so as the variable speed compressor may wear out prematurely.

Referring now to FIG. 9, a time delay subroutine generally indicated by numeral 320 tests the compressors to be turned on or off in response to running of the compressor next sequence subroutine 144 to determine if the compressors to be turned on or off satisfy a predetermined time delay requirement. Once a compressor is turned off, it is not desirable to turn the compressor immediately back on, and if the compressor has just been turned on, it is not desirable to turn the compressor immediately back off, as in either case premature wear may result, so that compressor life is decreased. The time delay subroutine 320 checks the compressors in the stage selected by the subroutine 144 such that flags are set are examined at test 259, 254, 282, and 296 of subroutine 144. Referring to FIG. 9, the program at 322 first compares the selected compressor combination selected by subroutine 144 and compares the selected compressors of the selected stage with the current compressor selection to determine if one or more of the compressors need to be turned on or off, as indicated at 322 in FIG. 9. The program then tests, at 324, each of the compressors to be turned on to determine if the time that they have been turned off is less than the minimum off time. If the test at 324 is positive, the time delay requirements are not satisfied, so the time delay flag is set at 1 as indicated at 326 in FIG. 9. The program then tests at 328 as to whether the on time of any compressor to be turned off is less than the minimum on time. If the test at 328 is positive, the time delay requirements are not satisfied and the time delay flag is set at 1 as indicated at 326. If both tests at 324 and 328 are negative, the time delay requirements are satisfied, so the time delay flag is set at 0, as indicated at 330 in FIG. 9. The program then returns to the subroutine 144 of FIG. 8.

Accordingly, it can be seen that the program 118 calculates a speed for the variable speed compressor without regard to any change in the fixed compressor stages. This variable is used to add or subtract compressors from the system and to adjust the speed of the variable speed compressor to tailor the system as much as possible to system refrigeration demand requirements. The speed of the variable speed compressor is calculated as a function of a variable which indicates the refrigeration load on the system, such as the suction pressure in the compressor inlet manifold. The speed is calculated using a conventional proportional integral differential control law (or "PID") based on the difference in the suction pressure and a target pressure which is varied as a function of the temperature in the refrigerator cases. To the normal PID control, an acceleration term is added which is responsive to the second derivative with respect to time of changes in the difference between the sensed pressure and the target pressure. Furthermore, the coefficient of the proportional term of the PID controller is itself varied as a function of the difference between suction pressure and actual pressure, so that a term equal to the square of this difference in pressures is introduced into the control log. Accordingly, the system is made much more sensitive to abrupt changes in refrigeration demand than in the prior art.

I claim:

1. Capacity control system for a commercial refrigeration system having at least one refrigerator case, said refrigeration system including a compressor system for compressing refrigerant, said compressor system including a variable speed compressor and fixed speed compressors whereby the capacity of said system can be controlled by varying the speed of the variable speed compressor and by turning said fixed speed compressors on or off, said control system including load sensing means for detecting a variable indicative of the refrigeration load on the system, means for comparing said variable with a target value and generating a difference signal varying in accordance with the difference between the variable and the target value, and calculating means for calculating a compressor control signal for controlling the capacity of said system as a function of the second derivative with respect to time of said difference signal.

2. Capacity control system as claimed in claim 1, wherein said compressor control signal is calculated by said calculating means as a function of the difference signal, the integral of the difference signal, and the first derivative of the difference signal as well as said second derivative of the difference signal.

3. Capacity control system as claimed in claim 2, wherein said compressor control signal is calculated by said calculating means also as a function of the square of the difference signal.

4. Capacity control system as claimed in claim 2, wherein said calculating means includes means for adjusting the target value, and means for multiplying said integral of the difference signal by a factor which varies as a function of the target value.

5. Capacity control system as claimed in claim 2, wherein said variable is compressor inlet pressure.

6. Capacity control system as claimed in claim 2, wherein said variable is the temperature in said refrigerator case.

7. Capacity control system for a commercial refrigeration system having at least one refrigerator case, said refrigeration system including a compressor system for compressing refrigerant, said compressor system including a variable speed compressor and fixed speed compressors whereby the capacity of said system can be controlled by varying the speed of the variable speed compressor and by turning said fixed speed compressors on or off, said control system including load sensing means for detecting a variable indicative of the refrigeration load on the system, means for comparing said variable with a target value and generating a difference signal varying in accordance with the difference between the variable and the target value, and calculating means for calculating a compressor control signal for controlling the capacity of said system as a function of the difference signal and also as a function of the square of the difference signal.

8. Capacity control system as claimed in claim 7, wherein said calculating means includes means for adjusting the target value, and means for multiplying the integral of the difference signal by a factor which varies as a function of the target value to form an integral term, and means for varying said compressor control signal as a function of the integral term.

9. Capacity control system as claimed in claim 8, wherein the variable is compressor inlet pressure, and the calculating means includes means for adjusting the target value as a function of the temperature within the refrigerator case.

10. Method of controlling capacity of a commercial refrigeration system having at least one refrigerator case, said refrigeration system including a compressor system for compressing refrigerant, said compressor system including a variable speed compressor and fixed speed compressors whereby the capacity of said system can be controlled by trying the speed of the variable speed compressor and by turning said fixed speed compressors on or off, said method including the steps of measuring a variable indicative of the refrigeration load on the system, comparing said variable with a target value and generating a difference signal varying in accordance with the difference between the variable and the target value, and calculating a compressor control signal for controlling the capacity of said system as a function of the second derivative with respect to time of said difference signal for regulating the speed of the variable speed compressor.

11. Method of controlling capacity as claimed in claim 10, including the steps of calculating said compressor control signal as a function of the difference signal, the integral of the difference signal, and the first derivative of the difference signal as well as said second derivative of the difference signal.

12. Method of controlling capacity as claimed in claim 11, including the steps of calculating said compressor control signal also as a function of the square of the difference signal.

13. Method of controlling capacity as claimed in claim 11, including the steps of adjusting the target value, and multiplying said integral of the difference signal by a factor which varies as a function of the target value.

14. Method of controlling capacity as claimed in claim 11, wherein said variable is compressor inlet pressure.

15. Method of controlling capacity as claimed in claim 11, wherein said variable is the temperature in said refrigerator case.

16. Method of controlling capacity of a commercial refrigeration system having at least one refrigerator case, said refrigeration system including a compressor system for compressing refrigerant, said compressor system including a variable speed compressor and fixed speed compressors whereby the capacity of said system can be controlled by varying the speed of the variable speed compressor and by turning said fixed speed compressors on or off, said method including the steps of sensing a variable indicative of the refrigeration load on the system, comparing said variable with a target value and generating a difference signal varying in accordance with the difference between the variable and the target value, and calculating a compressor control signal for controlling said system as a function of the difference signal and also as a function of the square of the difference signal.

17. Method of controlling capacity claimed in claim 16, including the steps of adjusting the target value, and multiplying the integral of the difference signal by a factor which varies as a function of the target value to form an integral term, and varying said compressor control signal as a function of the integral term.

18. Method of controlling capacity as claimed in claim 17, wherein the variable is compressor inlet pressure, said method including the steps of adjusting the target value as a function of the temperature within the refrigerator case.

19. Capacity control system for a commercial refrigeration system having at least one refrigerator case, said refrigeration system including a compressor system for compressing refrigerant, said compressor system including a variable speed compressor and multiple fixed speed compressors of different capacities whereby the capacity of said system can be controlled by varying the speed of the variable speed compressor and by starting and stopping one or more of the fixed speed compressors, said control system including load sensing means for detecting a variable indicative of the refrigeration load on the system, means for comparing said variable with a target value and generating a difference signal varying in accordance with the difference between the variable and the target value, and calculating means for forming an array of the capacities of the varying combinations of the fixed speed compressors and for generating a compressor control signal as a function of the difference signal representing the capacity of the system required by the system load, said calculating means further including means for selecting a system fixed speed compressor capacity from said array and controlling the speed of said variable speed compressor to provide an approximate total system compressor capacity represented by the compressor control signal, said calculating means calculating a range of desired speeds of said variable speed compressor, said system fixed speed compressor capacity being selected to maintain the speed of said variable speed compressor within said range.

20. Capacity control system as claimed in claim 19, wherein said calculating means includes means testing the compressors providing the fixed speed compressor capacity selected from said array to determine if the selected fixed speed compressors satisfy predetermine run time criteria.

21. Capacity control system for a commercial refrigeration system having at least one refrigerator case, said refrigeration system including a compressor system for compressing refrigerant, said compressor system including a variable speed compressor and multiple fixed speed compressors of different capacities whereby the capacity of said system can be controlled by varying the speed of the variable speed compressor and by starting and stopping one or more of the fixed speed compressors, said control system including load sensing means for detecting a variable indicative of the refrigeration load on the system, means for comparing said variable with a target value and generating a difference signal varying in accordance with the difference between the variable and the target value, and calculating means for forming an array of the capacities of the varying combinations of the fixed speed compressors and for generating a compressor control signal as a function of the difference signal representing the capacity of the system required by the system load, said calculating means further including means for selecting a system fixed speed compressor capacity from said array and controlling the speed of said variable speed compressor to provide an approximate total system compressor capacity represented by the compressor control signal, said calculating means calculating a range of desired speeds of said variable speed compressor, said calculating means including means for calculating the upper and lower boundaries for the compressor capacity of the fixed speed compressors to be selected from said array, selecting means for selecting a combination of compressors from said array within said range, and means for setting the speed of said variable speed compressor.

22. Capacity control system as claimed in claim 21, wherein said selecting means selects said combination of compressors from said array having a total capacity closest to the average between said upper and lower boundaries.

23. Capacity control system as claimed in claim 22, wherein said calculating means includes means for determining if the compressors selected from said array satisfy a predetermined run time criteria and run time means for causing said selecting means to select another combination of compressors from said array if said run time criteria is not satisfied.

24. Capacity control system as claimed in claim 23, wherein said run time means includes means for determining if an operating compressor has been operating for more than a predetermined time period and means for determining if a compressor which is not operating has been turned off for a predecided time period before starting or stopping said compressors.

25. Method of controlling capacity of a commercial refrigeration system having at least one refrigerator case, said refrigeration system including a compressor system for compressing refrigerant, said compressor system including a variable speed compressor and multiple fixed speed compressors of different capacities, comprising the steps of controlling the capacity of said system by varying the speed of the variable speed compressor and by starting and stopping one or more of the fixed speed compressors by detecting a variable indicative of the refrigeration load on the system, comparing said variable with a target value and generating a difference signal varying in accordance with the difference between the variable and the target value, forming an array of the capacities of the varying combinations of the fixed speed compressors, generating a compressor control signal as a function of the difference signal representing the capacity of the system required by the system load, selecting a system fixed speed compressor capacity from said array, controlling the speed of said variable speed compressor to provide an approximate total system compressor capacity represented by the compressor control signal, calculating a range of desired speeds of said variable speed compressor and selecting said system fixed speed compressor capacity to maintain the speed of said variable speed compressor within said range.

26. Method of controlling capacity as claimed in claim 25, including the step of testing the compressors providing the fixed speed compressor capacity selected from said array to determine if the selected fixed speed compressors satisfy predetermine run time criteria.

27. Method of controlling capacity of a commercial refrigeration system having at least one refrigerator case, said refrigeration system including a compressor system for compressing refrigerant, said compressor system including a variable speed compressor and multiple fixed speed compressors of different capacities, comprising the steps of controlling the capacity of said system by varying the speed of the variable speed compressor and by starting and stopping one or more of the fixed speed compressors by detecting a variable indicative of the refrigeration load on the system, comparing said variable with a target value and generating a difference signal varying in accordance with the difference between the variable and the target value, forming an array of the capacities of the varying combinations of the fixed speed compressors, generating a compressor control signal as a function of the difference signal representing the capacity of the system required by the system load, selecting a system fixed speed compressor capacity from said array, controlling the speed of said variable speed compressor to provide an approximate total system compressor capacity represented by the compressor control signal, calculating the upper and lower boundaries for the compressor capacity of the fixed speed compressors to be selected from said array, selecting a combination of compressors from said array within said range, and setting the speed of said variable speed compressor.

28. Method of controlling capacity as claimed in claim 27, said method including the step of selecting said combination of compressors from said array having a total capacity that is closest to the average between said upper and lower boundaries.

29. Method of controlling capacity as claimed in claim 28, including the steps of determining if the compressors selected from said array satisfy a predetermined run time criteria and causing said selecting means to select another combination of compressors from said array if said run time criteria is not satisfied.

30. Method of controlling capacity as claimed in claim 29, including the steps of determining if an operating compressor has been operating for more than a predetermined time period and means for determining if a compressor which is not operating has been turned off for a predecided time period before starting or stopping said compressors.

31. Method of controlling capacity as claimed in claim 29, including the step of selecting the combination of compressors from said array satisfying said run time criteria closest to the upper boundary if capacity is to be added and said lower boundary if capacity to be reduced if a combination of compressors satisfying said run time criteria cannot be selected from said array after a predetermined number of attempts.

* * * * *